United States Patent
Wu et al.

(10) Patent No.: US 10,177,958 B2
(45) Date of Patent: Jan. 8, 2019

(54) METHOD FOR SYNCHRONOUSLY TAKING AUDIO AND VIDEO IN ORDER TO PROCEED ONE-TO-MULTI MULTIMEDIA STREAM

(71) Applicant: Da Sheng Inc., New Taipei (TW)

(72) Inventors: Chang-Yu Wu, New Taipei (TW); Shun-Hsiang Hsu, New Taipei (TW); Yao-Chung Hsu, New Taipei (TW); Chi-Hung Wu, New Taipei (TW)

(73) Assignee: DA SHENG INC., Taipei (TW)

( * ) Notice: Subject to any disclaimer, the term of this patent is extended or adjusted under 35 U.S.C. 154(b) by 181 days.

(21) Appl. No.: 15/427,029

(22) Filed: Feb. 7, 2017

(65) Prior Publication Data

US 2018/0227164 A1    Aug. 9, 2018

(51) Int. Cl.
- *G06F 15/16* (2006.01)
- *H04L 29/06* (2006.01)
- *H04L 12/24* (2006.01)
- *H04L 12/40* (2006.01)
- *H04L 12/28* (2006.01)
- *H04N 21/2368* (2011.01)
- *H04N 21/43* (2011.01)

(52) U.S. Cl.
CPC .... *H04L 29/06027* (2013.01); *H04L 12/2814* (2013.01); *H04L 12/40117* (2013.01); *H04L 29/06476* (2013.01); *H04L 41/509* (2013.01); *H04N 21/2368* (2013.01); *H04N 21/4307* (2013.01)

(58) Field of Classification Search
CPC ....................... H04L 29/06027; H04N 21/2368
USPC .......................................................... 709/231
See application file for complete search history.

(56) References Cited

U.S. PATENT DOCUMENTS

| | | | |
|---|---|---|---|
| 2006/0034337 A1* | 2/2006 | Ryu | H04N 21/234318 370/503 |
| 2007/0271388 A1* | 11/2007 | Bowra | H04L 65/602 709/231 |
| 2009/0089842 A1* | 4/2009 | Perry | H04W 72/005 725/78 |
| 2010/0198992 A1* | 8/2010 | Morrison | G06F 17/30056 709/248 |
| 2013/0021525 A1* | 1/2013 | Karunakar | H04N 21/2368 348/515 |
| 2013/0038792 A1* | 2/2013 | Quigley | A61H 19/00 348/515 |
| 2014/0079372 A1* | 3/2014 | Zhang | G06K 9/00765 386/241 |

(Continued)

*Primary Examiner* — Hamza N Algibhah
(74) *Attorney, Agent, or Firm* — Chun-Ming Shih (57) ABSTRACT

A one-to-multi multimedia stream method separately gets video and audio sources form the video and audio chips of a mobile device and reanalyzes related source data to correct the timestamp of video and audio data to ensure the synchronization of the output video and audio. Thus the incapability caused by not synchronized audio and video in stream decoding server can be solved. The present invention is configured to retrieve video and audio via mobile device without ffmpeg open source kits for format transformation, which greatly reduces operation and power consumption of CPU of mobile phone, and the mobile device can proceed one-to-multi video and audio transmission to a plurality of multimedia stream servers simultaneously.

10 Claims, 3 Drawing Sheets

(56) References Cited

U.S. PATENT DOCUMENTS

| | | | |
|---|---|---|---|
| 2015/0093096 A1* | 4/2015 | Mishra | H04N 21/2665 386/241 |
| 2015/0382050 A1* | 12/2015 | Le Nerriec | H04L 45/16 725/80 |
| 2016/0014373 A1* | 1/2016 | LaFata | H04N 7/152 348/14.08 |
| 2016/0073155 A1* | 3/2016 | Subramaniam | H04N 21/4316 725/32 |
| 2016/0205349 A1* | 7/2016 | Cheng | H04N 5/06 348/14.08 |
| 2017/0223769 A1* | 8/2017 | Takahashi | H04J 3/0697 |
| 2018/0115799 A1* | 4/2018 | Thiele | G11B 27/10 |

* cited by examiner

METHOD FOR SYNCHRONOUSLY TAKING AUDIO AND VIDEO IN ORDER TO PROCEED ONE-TO-MULTI MULTIMEDIA STREAM

BACKGROUND OF THE INVENTION

1. Field of the Invention

The invention relates to a technical scheme for improving sound and video streaming of audio and video streams. More particularly, the invention relates to a method for synchronously taking audio and video hardware sources of cellphone for delivering stream from one multimedia source to a plurality of different multimedia servers.

2. Description of the Prior Art

As the technology development and demand of net era, multimedia data transmission technologies grow rapidly. Few years ago only few network provides instant multimedia display or broadcast service, and the service becomes popular recently. Of course, the related technologies become essential to service providers.

The conventional audio and video retrieving technologies is achieved by using a huge camera at a particular location to shoot a particular object, and then the file is proceed in a workshop to be compressed by computer for uploading on corresponding network platform for public viewing. The process is complicated and the profession equipment is too expensive for common user to have.

However, as the technologies grow, nowadays the hardware technologies are quite over the conventional video and audio retrieving technologies. Recently the smart phone or tablet become popular and the user can easily use them for shooting a clip of clear and smooth movie. Accompanying with convenient wireless network, the user can upload the content on the multimedia server or platform easily without complicate process. Thus the user of the platform can rapidly get the updated multimedia data, which is quite progressive comparing with the conventional technology.

However, the aforementioned multimedia data streaming technology for the user to use via mobile device is still limited. For example, the smart phone or tablet communicates with a plurality of RTMP servers for instant video and audio stream via network. To accomplish the video and audio stream, most mobile devices install multimedia stream application program based on ffmpeg open source core. This kind of multimedia stream program is configured to first retrieve the original video and audio data in the device and then compress the video and audio data into digital type data to comply with the required digital stream format of RTMP server.

But the aforementioned multimedia stream technology needs huge operation of multimedia data compression and transformation, which cause significant loading on CPU and memory of the device. Especially when the CPU and memory of a mobile device is limited, to broadcast multimedia data is a huge loading. Besides, the aforementioned ffmpeg development kits of the development program is not only having huge codes but also complicated. This would cause signification operation loading on CPU and power consumption of the device when it operates.

It is noted that using ffmpeg kits would cause the aforementioned issues, thus if the device is configured to apply the aforementioned technology to proceed multimedia stream, usually the mobile device can only proceed multimedia stream to one RTMP server. If it needs to upload multimedia stream to another RTMP server, then some common steps have to be repeated. It is clear that, by the operation, synchronous multimedia stream among a plurality of RTMP servers is impossible. Thus, it is impossible to realize synchronous multimedia stream among one mobile device and a plurality of RTMP servers by the aforementioned technology.

As aforementioned, by using mobile device to realize instant, synchronous multimedia stream display still face several issues that the people skilled in the art needs to study, develop, and solve.

The inventor of the present invention dedicates in the field of technology. After long time study and experiment, the inventor accomplishes the present invention of method for synchronously taking audio and video in order to proceed one-to-multi multimedia stream.

SUMMARY OF THE INVENTION

The main objective of the present invention is to provide a method for synchronously taking audio and video in order to proceed one-to-multi multimedia stream, which is able for an user to use one mobile device to proceed multiplex stream of multimedia data on a plurality of RTMP servers. The user only upload the multimedia data once, then the other users can instantly and synchronously watch the same multimedia data on different multimedia platform.

The function of the present invention is to provide a thread structure using separated video and audio sources, which has an audio controlling module and a video controlling module to respectively get video data (H.26x) and un-coded audio data via the hardware abstraction layer of hardware of smart phone, tablet, or similar mobile device.

The mobile device of different brand usually applies different video and audio chip module, thus, the present invention is configured to apple audio controlling module and video controlling module to correct irregular timestamp corresponding to different chips and can integrate multimedia data with different timestamp as the multimedia data with synchronous timeline.

To simultaneously transmit video and audio data to different stream servers, the present invention applies the audio controlling module to set up the audio coder. However, even the transmission is to different stream servers, the method of the present invention still comprises step of setting an initial configuration on an audio coder to reduce working load of whole process.

However, to saving working load of central processor and to enhance usage rate of memory, the video controlling module and audio controlling module of the present invention is configured to use the same hardware coder to code corresponding to different stream servers. Before stream transmission among different stream servers, it would assign independent multimedia buffer for data storage. Thus, the present invention would not need too many coder working simultaneously to slowdown the system. Also, when transmitting different stream package, operation abnormal of one server would not influence other packages.

To achieve the objective of the present invention, the method of the present invention is to respectively transmit video and audio to different stream servers for display according to different address and key assigned by the user. To pass through firewall to transmit data, it is able to activate different port for display. To prevent data loss due to transmission jam, the present invention applies a stream controlling module to set independent socket buffer corresponding to different stream server when the transmission begins, and independent thread would be activated according to different requirement from stream servers for package transmission. Thus, maximum throughput of data can be achieved.

Finally, the audio controlling module and video controlling module of the present invention are configured to analyze data when receiving coded video or audio data. The data content format is adapted for integrating information into the prolog to form an universal stream format. Then the stream controlling module would activate different thread for package transmission of different stream servers to put the package into predetermined transmission buffer queue until the synchronous transmission among one device and a plurality of servers begins.

More particularly, method for synchronously taking audio and video in order to proceed one-to-multi multimedia stream of the present invention mainly comprises steps as below.

For audio collection, the step comprises: first, proceeding an audio synchronous process through an audio controlling module to get a coded audio coding information from an audio chip of a mobile device via a Hardware Abstraction Layer thereof and get an audio coding parameter, wherein the audio controlling module is configured to temporarily store the audio coding information according to different streaming servers; then proceeding an audio correction process to do time stamp correction of temporarily stored audio coding information according to the fixed output frame rate of an audio coder.

For video collection, the step comprises: first proceeding a video synchronous process through an video controlling module to get a coded video coding information from a video chip of a mobile device via a Hardware Abstraction Layer thereof and get a video coding parameter, wherein the video controlling module is configured to temporarily store the video coding information according to different streaming servers; then proceeding a video correction process to do time stamp correction of temporarily stored audio coding information according to the real receiving time on each streaming server.

The aforementioned audio and video collection can be executed simultaneously.

Then the present invention executes steps of: establishing a video and audio metadata before the multimedia stream being transmitted to each streaming server by a stream controlling module; and confirming connection to each different streaming server by the stream controlling module.

Then the present invention executes steps of: selectively joining the audio coding parameter into the audio coding information corrected by the time stamp via a message package format for packaging and generating a plurality of audio stream packages by the stream controlling module; and selectively joining the video coding parameter into the audio coding information corrected by the time stamp via a message package format for packaging and generating a plurality of audio stream packages by the stream controlling module.

Finally, the present invention executes step of transmitting the audio and video metadata to each streaming server and then sequentially transmitting each audio stream package and video stream package corresponding to each stream server to each stream server by the stream controlling module to proceed the one-to-multi multimedia stream on each streaming server.

According to the aforementioned description, it is known that the present invention is able to process the method for synchronously taking audio and video in order to proceed one-to-multi multimedia stream.

DETAILED DESCRIPTION OF THE PREFERRED EMBODIMENT

To explicate the objective, technology and advantages of the embodiment of the present invention, the following paragraphs jointly with figures would clearly and completely explain the technology of embodiment of the present invention. It should be noted that the embodiment is not all possible embodiment of the present invention. According to the embodiment of the present invention, people skilled in the art would be able to think other related embodiment that should be deemed as being within the scope of the present invention.

Figure 1:
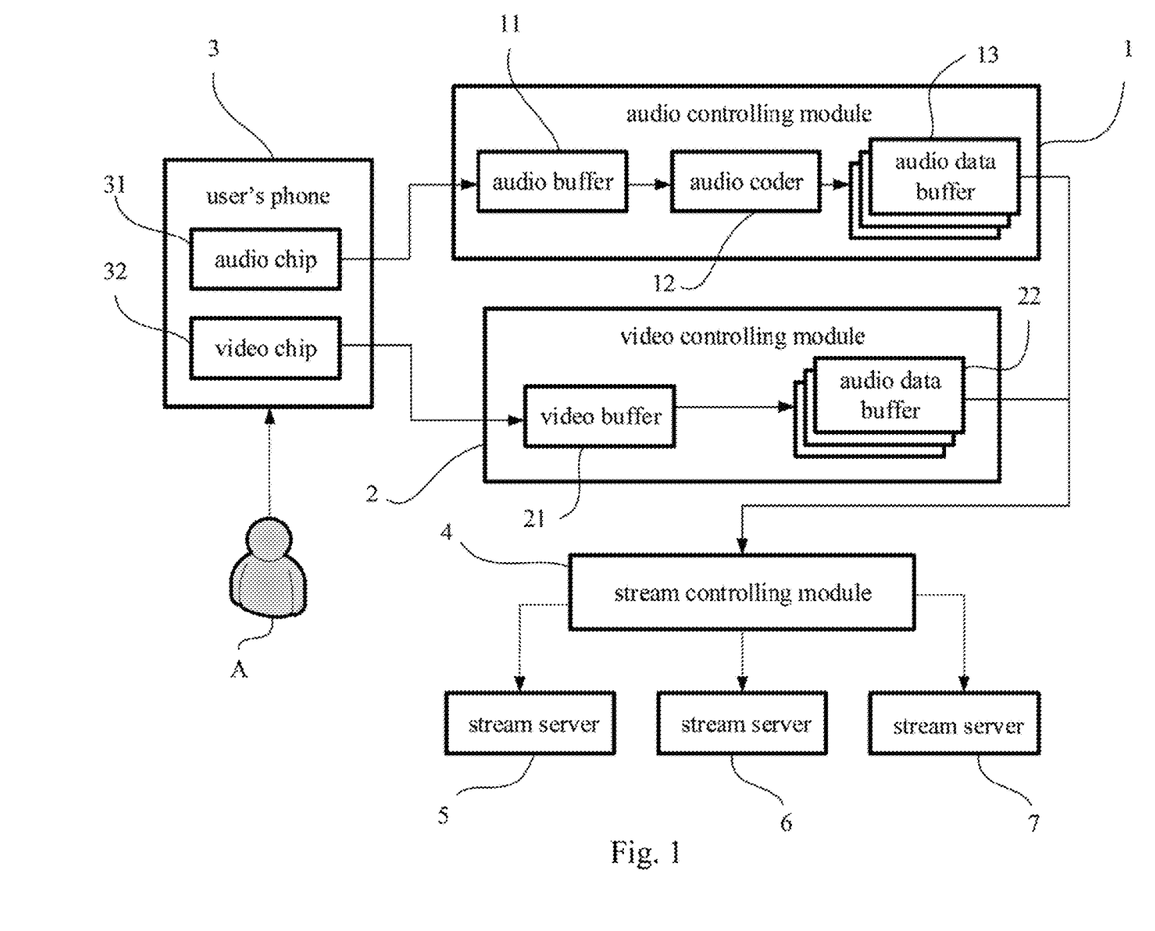
FIG. 1 shows module diagram of the present invention of method for synchronously taking audio and video in order to proceed one-to-multi multimedia stream.

FIG. 1 shows module diagram of the present invention of method for synchronously taking audio and video in order to proceed one-to-multi multimedia stream.

According to the present invention, when an user A uses smart phone 3 to upload multimedia data, an audio controlling module 1 is executed to get original audio data from the hardware abstraction layer of the audio chip 31 of the smart phone 3 for being inputted into the audio buffer 11. Then, when the original audio data is coded by the predetermined audio coder 12, the audio controlling module 1 retrieves the coded audio coding data from the output queue. Then the audio controlling module 1 arranges audio coding data and separately input into a plurality of audio data buffer 13 of different stream servers. The audio controlling module 1 also records the corresponding audio coding parameter for the audio coder 12 to process coding.

Besides, simultaneously with audio retrieving program, the present invention applies a video controlling module 2 to retrieve coded video coding data from the output queue of the hardware abstraction layer of the video chip 32 of the smart phone 3 for input the data into video buffer. The video controlling module 2 is configured to arrange the video coding data, record the video coding parameter corresponding to coding process, and input the video coding data input a plurality of video data buffer 22 of different stream servers respectively.

Then, in the embodiment, the present invention is configured to connect to three different stream server 5, stream server 6, and stream server 7 via a stream controlling module 4. Thus the video and audio stream packages independently corrected by the audio controlling module 1 and video controlling module 2 respectively corresponding to the stream server 5, stream server 6, and stream server 7 would be transmitted outward, and the method for synchronously taking audio and video in order to proceed one-to-multi multimedia stream of the present invention is accomplished.

Figure 2:
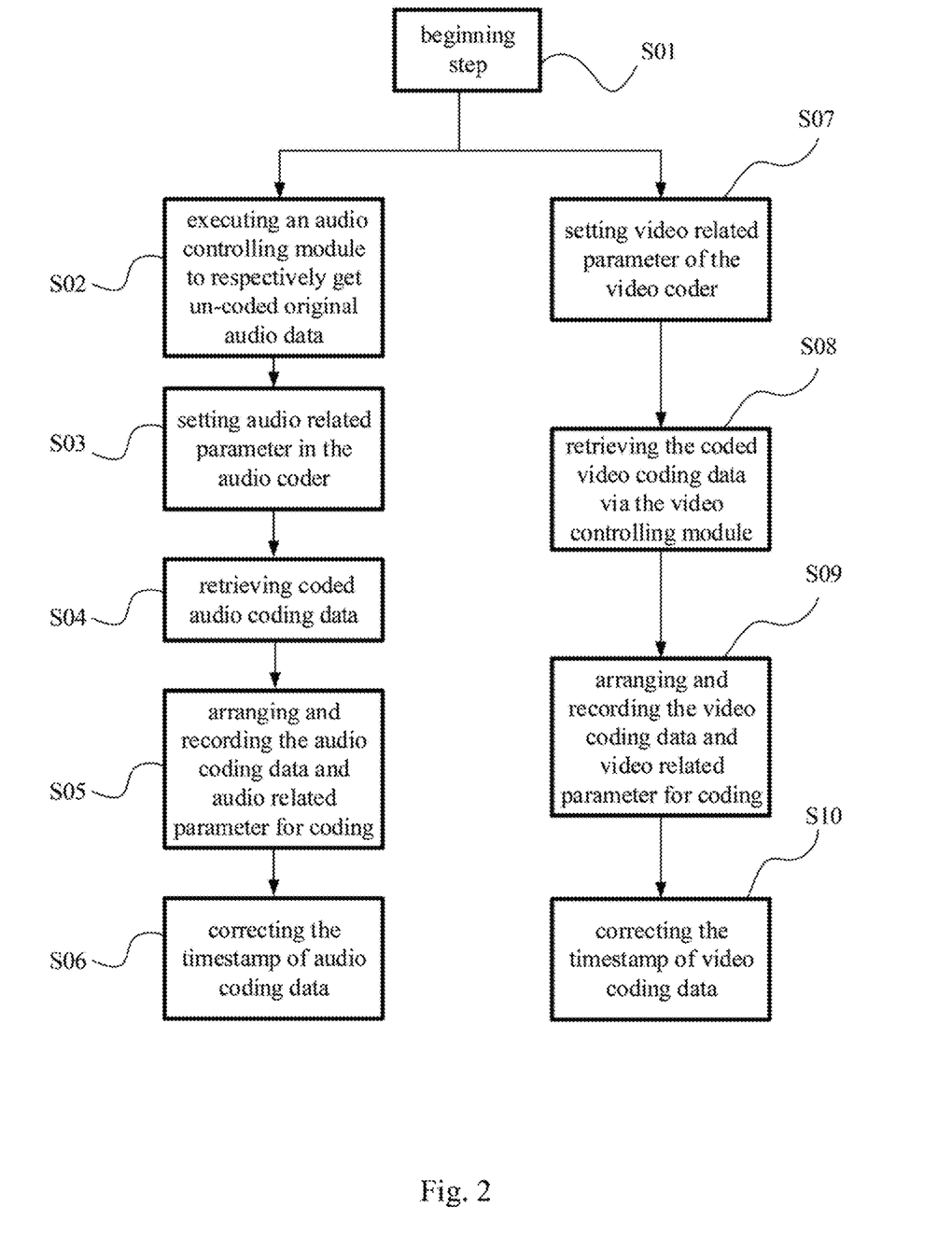
FIG. 2 shows flow diagram of the method for synchronously taking audio and video in order to proceed one-to-multi multimedia stream of the present invention.

FIG. 2 shows flow diagram of the method for synchronously taking audio and video in order to proceed one-to-multi multimedia stream of the present invention. It comprises steps as below.

Step S01, beginning step:

The method of the present invention is to make the CPU and GPU of the mobile device get benefit among usage efficiency and balance in stream process. Thus, it requires separated exclusive threads for the video and audio generated by the hardware of mobile device, and that is coding-receiving thread and stream-package thread.

The coding-receiving thread is configured to receive data from the hardware abstraction layer of multimedia hardware and store in particular data buffer. The stream-package thread is configured to retrieve the data from the data buffer to package them in stream format for output. It is advantaged to independently apply the two exclusive threads for video and audio: (a) using two threads by the application program can avoid waiting time in retrieving data from the hardware abstraction layer, which may cause being unable to package and output the data in particular buffer in time; (b) when the internet connection is unstable, the application program would be busy in transmitting packaged stream data, and the execution of retrieving data from the hardware abstraction layer would be delayed.

When the aforementioned situations happen, it may cause discontinuity of video or audio or even crash the application program, thus the present invention is configured to apply exclusive threads for independently proceeding video and audio. The instability and over-loading duet to mutual-interference between video and audio can be avoided, and the hardware efficiency and stability of operation system can be ensured.

For example, the run code of the step can be as below.

```
data_produce = new Thread(new Runnable( ) {
    @Override
    public void run( ) {
        Log.i(TAG, clsName + " data_produce running");
//android.os.Process.setThreadPriority(android.os.Process.THREAD_PRI
ORITY_URGENT_AUDIO);
        while (true) {
            Packet p = fillPacket( );
            if (p == null) {
                Log.w(TAG, clsName + " data_produce exit");
                break;
            }
            try {
                dataQueue.put(p);
            } catch (InterruptedException e) {
                Log.e(TAG, clsName + " data_produce interrupted");
                break;
            }
        }
        Log.i(TAG, clsName + " data_produce exited.");
    }
});
public void run( ) {
//android.os.Process.setThreadPriority(android.os.Process.THREAD_PRI
ORITY_URGENT_AUDIO);
    Log.i(TAG, clsName + " data_consume running");
    while(true) {
        //try_delay( );
        try {
            Packet p = dataQueue.take( );
            if (p.data == null) {
                Log.w(TAG, clsName + " data_consume exit");
                break;
            }
            //calculate_fps( );
            writefile(p.data, p.timestamp);
            sendPacket(p);
            //Thread.sleep(100);
        } catch (Interrupted Exception e) {
            Log.e(TAG, clsName + " data_consume interrupted");
            break;
```

-continued

```
        }
    }
```

Step S02: executing an audio controlling module to respectively get un-coded original audio data.

For audio retrieving process, the audio controlling module does not have to set up in response to different stream servers. Thus the audio controlling module of the present invention only need one-time configuration of common audio source related parameter of stream servers when the whole program starts, which is called as an audio related parameter. The parameter can comprises: sample rate, sample channel quantity, such as stereo/mono, channel source of sampling, such as microphone or other device, bit of audio data, such as 8 bit or 16 bit. If the audio information is lost during coding, the user would hear discontinuous sounds, thus the audio controlling module of the present invention is configured to set an external data buffer for audio data to temporarily store the retrieved audio data. Besides, to ensure the retrieved audio data can be continuously delivered to the audio coder, the thread of the present invention for audio data retrieving has a higher priority than other general threads to prevent other threads from interrupting audio data retrieving operation. Thus the operation system can arrange more time for audio data retrieving operation when it arranges threads sequence.

For example, the run code of the step can be as below.

```
android.os.Process.setThreadPriority(android.os.Process.THREAD_PRIO
RITY_URGENT_AUDIO);
try {
    final int min_buffer_size = AudioRecord.getMinBufferSize(
        SAMPLE_RATE, CHANNEL_IN_STEREO,
        ENCODING_PCM_16BIT);
    int buffer_size =
    SAMPLES_PER_FRAME *
FRAMES_PER_BUFFER;
    if (buffer_size < min_buffer_size)
        buffer_size = ((min_buffer_size /
            SAMPLES_PER_FRAME) + 1)
* SAMPLES_PER_FRAME * 2;
    AudioRecord audioRecord = null;
    try {
        audioRecord = new AudioRecord(
            MIC, SAMPLE_RATE,
            CHANNEL_IN_STEREO,
ENCODING_PCM_16BIT, buffer_size);
        if     (audioRecord.getState( )        !=
AudioRecord.STATE_INITIALIZED)
            audioRecord = null;
    } catch (final Exception e) {
        audioRecord = null;
    }
```

Step S03: setting audio related parameter in the audio coder.

The audio controlling module of the present invention is configured to set the audio related parameter of the audio coder in advance, which comprises: profile for the audio coder, sample rate of audio coding, sound channel quantity for audio coding (mono or stereo), and bit rate of audio coding. The audio controlling module would apply the configuration in audio coder and then activate the audio coder for coding.

For example, the run code of the step can be as below.

```
Format =
MediaFormat.createAudioFormat(MIME_TYPE,
SAMPLE_RATE, 2);
format.setInteger(KEY_AAC_PROFILE, AACObjectLC);
format.setInteger(KEY_CHANNEL_MASK,
CHANNEL_IN_STEREO);
format.setInteger(KEY_BIT_RATE, BIT_RATE);
format.setInteger(KEY_CHANNEL_COUNT, 2);
mEncoder = createEncoderByType(AUDIO_MIME_TYPE);
mEncoder.configure(format, null, null, CONFIGURE_ENCODE);
mEncoder. start( );
```

Step S04: retrieving coded audio coding data.

The audio controlling module of the present invention is configured to establish audio coding thread, which is configured to ensure the un-coded original audio data have been stored in the audio buffer by synchronous latch mechanism before getting the coded audio data coded by the coder. If the data is confirmed, then it is able to retrieve the audio coded data in the output queue through the hardware abstraction layer of the audio coder and transmit the audio coded data to different audio data buffers of threads of corresponding stream servers. The audio controlling module is configured to record the data quantity of audio data and remove unnecessary audio data prolog. Thus, only necessary audio data would be remained for being processed by the thread of output audio stream package.

For example, the run code of the step can be as below.

```
synchronized (mSync) {
    try {
        mSync.wait( );
    } catch (final InterruptedException e) {
    }
}
int ret = -1;
ByteBuffer[ ] encoderOutputBuffers = mEncoder.getOutputBuffers( );
while (true) {
    index mEncoder.dequeueOutputBuffer(mBufferInfo,
TIMEOUT_US);
    if (index == INF0_OUTPUT_FORMAT_CHANGED) {
        mPacketizer.addFormat(mEncoder.getOutputFormat( ));
    } else if (index == INFO_TRY_AGAIN_LATER) {
        //break;
    } else if (index < 0) {
        Log.e(TAG, "something happen?");
        break;
    } else {
        encodedData = encoderOutputBuffers[index];
        if (encodedData == null) {
            throw new RuntimeException("encoderOutputBuffer " +
index + " was null");
        }
```

Step S05: arranging and recording the audio coding data and audio related parameter for coding.

After the audio coding program of the audio coder begins, the audio controlling module receives the ASC information particularly for this audio coding program, which is adapted to be applied in later decoder for reference. The ASC parameter is adapted to describe the audio profile, audio sample rate, or audio channel quantity being applied in this audio coding program. The parameter has to be stored and delivered as the first audio package when the audio data package stream is later transmitted to the decoder side for decoding.

For example, the run code of the step can be as below.

```
private byte[ ] makeAsc(int sampleRateIndex)
{
    byte asc[ ] new byte[2];
    asc[0] = (byte) ( 0x10 | ((sampleRateIndex>>1) & 0x3) );
    asc[1] = (byte) ( ((sampleRateIndex & 0xl)<<7) | ((channelCount &
0xF) << 3) );
    logfile.WritetoFile(Thread.currentThread( ).getStackTrace( )[2],
"asc:"
+ printBuffer(asc, 0, asc.length));
    Log.i(TAG, "asc:" + printBuffer(asc, 0, asc.length));
    return asc;
}
```

Step S06: correcting the timestamp of audio coding data.

The audio controlling module of the present invention is configured to retrieve the audio coding data from the particular audio buffer for timestamp correction. The audio coder is configured to output in a predetermined frame rate per second, thus, if the system time at receiving the audio data is adapted as the timestamp, the decoder server is configured to decode based on the timestamp and will result in discontinuity of sound. Therefore, when recording the timestamp of audio, the present invention use the character of predetermined output frame rate of the audio coder to calculate the time interval between two frames and then times the accumulated frame quantity as the instant audio timestamp.

For example, the run code of the step can be as below.

```
// audio timestamp calculation is
// interval = 1024 * 1000(ms) / sample rate(hz)
// so we use packet number multiple intervalas AAC time stamp
tmp = fillFrame_media_codec( );
current_ts = (int) (audio_num * 10240 /
audiostream.get_sampling_rate( )) + timeBase;
audio_num++;
now_timestamp=System.currentTimeMillis( );
if (avctype == 0) {
    currentTime = 0;
}
else {
    if(bUseCommonTimestamp == true)
        currentTime = (int) (now_timestamp - timeBase);
    else
        currentTime = (int)(timestamp - timeBase);
    //Log.e(TAG, "audio ts: " + currentTime);
}
send(makeMessageFromTag(new       Tag(loConstants.TYPE_AUDIO,
currentTime, bodysize, body, prevSize)));
prevSize = bodysize;
```

Step S07: setting video related parameter of the video coder.

The video controlling module of the present invention is configured to be set with video parameter for video coding, which is called as a video related parameter, comprising: video width, video length, video frame per second (FPS), video group of picture (GOP), video coding bit rate, and video coding profile. The video controlling module applies the video related parameter to establish relation between the video source and video coder, thus the video coder can process video coding program.

For example, the run code of the step can be as below.

```
Format createVideoFormat(MIME_TYPE, width, height);
format.setInteger(KEY_COLOR_FORMAT, COLOR_FormatSurface);
format.setInteger(KEY_BIT_RATE, 1024*1024);
format.setInteger(KEY_FRAME_RATE, FRAME_RATE);
format.setInteger(KEY_I_FRAME_INTERVAL,
```

```
IFRAME_INTERVAL);
Log.d(TAG, "created video format: " + format);
mEncoder = createEncoderByType(MIME_TYPE);
mEncoder.configure(format, null, null, CONFIGURE_ENCODE);
mSurface = mEncoder.createInputSurface( );
Log.d(TAG, "created input surface: " + mSurface);
mEncoder.start( );
```

Step S08: retrieving the coded video coding data via the video controlling module.

After step S07, the video controlling module of the present invention establishes a video coding receiving thread for retrieving video. The video controlling module of the present invention is configured to check whether the coding output queue of the video coder comprises coded video data. If there is coded video data, then the video controlling module is configured to retrieve instant video coding data via the hardware abstraction layer of the video coder, and the video controlling module can additionally executing steps such as: recording the size of video coding data, checking whether the video is the I-frame or not, taking timestamp of the video data, removing unnecessary video data prolog and remaining necessary coding data, then the video controlling module is configured to store the video coding data and the aforementioned information into exclusive video buffer.

For example, the run code of the step can be as below.

```
ret = videostream. recordVirtualDisplay( );
if(false && net == -1)
{
    Log.e(TAG, "release edia odec");
    videostream.release_media_codec( );
    return null;
}
naluLength = videostream. getEncodedLength( );
header[0] = (byte) (((naluLength - 4) >> 24) & 0xff);
header[1] = (byte) (((naluLength - 4) >> 16) & 0xff);
header[2] = (byte) (((naluLength - 4) >> 8) & 0xff);
header[3] = (byte) (((naluLength 4) >> 0) & 0xff);
byte[ ] tmp = new byte[naluLength];
videostream.getEncodedData(tmp);
videostream.putEncodedData( );
if(videostream.isStreaming( ) == false)
    return null;
naluLength -= 4;
byte[ ] nalu = new byte[naluLength + header.length];
System.arraycopy(header, 0, nalu, 0, header.length);
System.arraycopy(tmp, 4, nalu, header.length, naluLength);
byte[ ] nalu = packet.data;
int nalType = nalu[4] & 0x1F;
if (nalType == 5 && !sentConfig) {
    Log.i(TAG, "Send configuration one time");
    byte[ ] conf = configurationFromSpsAndPps( );
    writemetadata( );
    writeVideoNalu(conf, System.currentTimeMillis( ), 0, true);
    sentConfig = true;
}
if (nalType == 7 || nalType == 8) {
    Log.w(TAG, "Received SPS/PPS frame, ignored");
}
//System.currentTimeMillis( );
if(sentConfig == true)
    writeVideoNalu(nalu, packet.timestamp, 1, (nalType == 5));
```

Step S09: arranging and recording the video coding data and video related parameter for coding.

After the video coder activates the video coding program, the video controlling module receives the SPS (Sequence Parameter Set and PPS (Picture Parameter Set) parameter generated by the video coding program, which comprises video format for coding, video format level of coding, length and width of coded video, and category of deblock filter. The two parameters have to be stored and delivered as the first video package when the video data package stream is later transmitted to the decoder side for decoding.

For example, the run code of the step can be as below.

```
if ((mBufferInfo.flags & CODEC_CONFIG) != 0) {
    encodedData.clear( );
    encodedData.get(data);
    for(int i = 0; i < data.length && found < 2; i++) {
        if(data[i] == 0x00 && data[i+1] == 0x00 && data[i+2] == 0x00 && data[i+3] == 0x01 && found == 0)
        {
            sps_index = i;
            sps_length = 1;
            found++;
            continue;
        }
        if(data[i] == 0x00 && data[i+1] == 0x00 && data[i+2] == 0x00 && data[i+3] == 0x01 && found == 1) {
            pps_index = i;
            sps_length = (i - sps_index - 4);
            pps_length = (data.length - pps_index - 4);
            found++;
            continue;
        }
    }
    System.arraycopy(data, (sps_index-4), sps, 0, sps_length);
    System.arraycopy(data, (pps_index-4), pps, 0, pps_length);
    ((H264Packetizer)mPacketizer).setStreamParameters(pps, sps);
    mBufferInfo.size = 0;
}
IoBuffer conf = IoBuffer.allocate(11+sps.length+pps.length);
conf.put((byte) 1); // version
conf.put(sps[1]); // profile
conf.put(sps[2]); // compat
conf.put(sps[3]); // level
conf.put((byte) 0xff); // 6 bits reserved + 2 bits nal size length - 1 (11)
conf.put((byte) 0xe1), // 3 bits reserved + 5 bits number of sps (00001)
conf.put(bel6((short)sps.length));
conf.put(sps);
conf.put((byte)1);
conf.put(bel6((short)pps.length));
conf.put(pps);
return conf.arrav( );
```

Step S10: correcting the timestamp of video coding data.

The video controlling module of the present invention is configured to retrieve the video coding data from the exclusive video buffer according to the demands from different stream servers and then transmits the video coding data to video data buffer of each thread of different stream servers. The video coder type of different mobile device could be various, some of them may use uncertain FPS output that varies the FPS of coding output according to the present running program. In this case, if the timestamp of video data is recorded by fixed time interval, the video would result in discontinuous or randomly fast/slow playing. Thus, the video controlling module of the present invention is configured to mark the timestamp of the video coding data according to the real time of receiving the video coding data to ensure the timeline of video is corrected and continuous.

For example, the run code of the step can be as below.

```
now_timestamp=System.currentTimeMillis( );
if(avctype == 0) {
    currentTime = 0;
}
else {
```

-continued

```
    if(bUseCommonTimestamp == true)
        currentTime = (int) (now_timestamp timeBase);
    else
        currentTime = (int)(timestamp timeBase);
    //Log.e(TAG, "video ts: " + currentTime);
}
send(makeMessageFromTag(new     Tag(loConstants.TYPE_VIDEO,
currentTime, bodysize, body, prevSize)));
```

Figure 3:
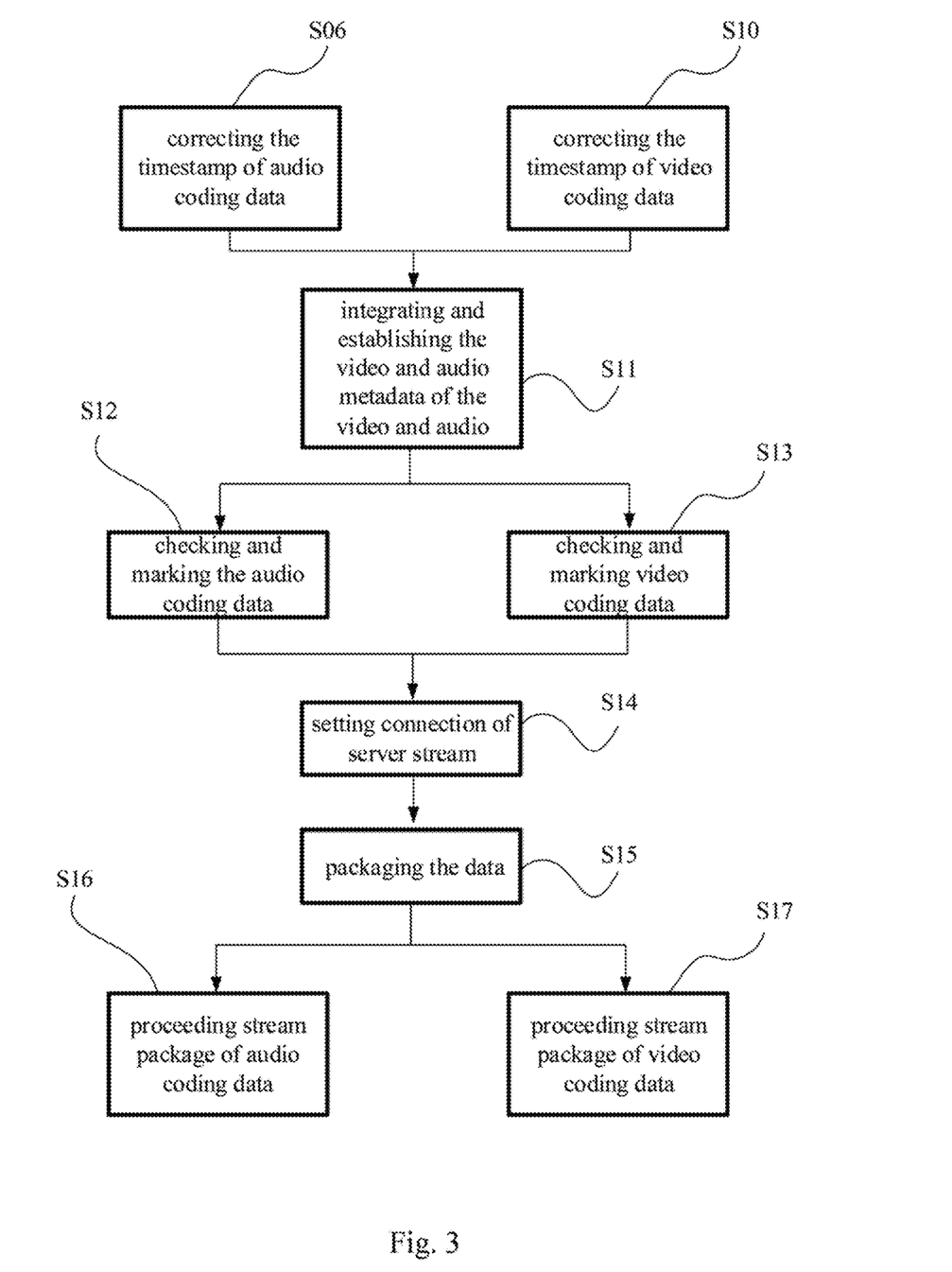
FIG. 3 shows flow diagram of the method for synchronously taking audio and video in order to proceed one-to-multi multimedia stream.

FIG. 3 of the present invention shows the flow diagram of the method for synchronously taking audio and video in order to proceed one-to-multi multimedia stream of the present invention in reference to FIG. 2.

Step S11: integrating and establishing the video and audio metadata of the video and audio.

After the stream protocol is established, before transmitting the video parameter package and audio parameter package, the stream controlling module of the present invention is configured to transmit the video and audio metadata for being transmitted this time in advance. The parameter comprises video width, video height, video data rate, video frame rate, video codec ID, audio data rate, audio sample rate, audio sample size, audio channels, whether the audio is mono or stereo, and audio codec ID. The information is retrieved before the video code and audio code are established as the audio coding parameter and video coding parameter. The video and audio metadata has to be transmitted before the stream controlling module transmits the video or audio package, then the decoder side can use it as the reference for establishing stream.

For example, the run code of the step can be as below.

```
private void writemetadata( ) throws IOException {
    loBuffer buf = loBuffer.allocate(192);
    buf.setAutoExpand(true);
    Output out = new Output(buf);
    out.writeString("@setDataFrame");
    out.writeString("onMetaData");
    Map<Object, Object> params = new HashMap<Object, Object>( );
    params.put("duration", Integer.valueOf(0));
    params.put("filesize", Integer.valueOf(0));
    params.put("width", Integer.valueOf(vjwidth));
    params.put("height", Integer.valueOf(v_height));
    params.put("videocodecid", "avc1");
    params.put("videodatarate", Integer.valueOf(1000));
    params.put("framerate", Integer.valueOf(30));
    params.put("audiocodecid", "mp4a");
    params.put("audiodatarate", Integer.valueOf(128));
    params.put("audiosamplerate", Integer.valueOf(44100));
    params.put("audiosamplesize", Integer.valueOf(16));
    params.put("audiochannels", Integer.valueOf(2));
    params.put("stereo", Boolean.TRUE);
    out.writeObject(params, new Serializer( ));
    buf.flip( );
    Tag onMetaData = new Tag(loConstants.TYPE_METADATA, 0,
100, buf, 0);
    send(makeMessageFromTag(onMetaData));
}
```

Step S12: checking and marking the audio coding data.

Before the stream controlling module packages the corrected audio coding data in the audio data buffer, the sample rate, whether the audio is mono or stereo, audio bit rate, or the audio codec ID of the audio coding data should be checked in advance. When package is processing, the stream controlling module is configured to mark the information in stream data for the decoder server as reference to process decoding.

For example, the run code of the step can be as below.

```
byte tagType = (byte) ((loConstants.FLAG_FORMAT_AAC << 4)) |
(loConstants.FLAG_SIZE_16_BIT << 1);
tagType |= loConstants.FLAG_RATE_44_KHZ << 2;
// FIXME: AudioStream already fixed the channel count is 1, so mono
only!
tagType |= (channelCount == 2 ? loConstants.FLAG_TYPE_STEREO :
loConstants.FLAG_TYPE_MONO);
body.setAutoExpand(true);
body.put(tagType);
body.put((byte)avctype);
```

Step S13: checking and marking video coding data.

Before the stream controlling module packages the corrected video coding data in the audio data buffer, whether the video frame is the I-frame, whether the package is SPS or PPS package, coding format of the video coder, and other related information should be checked in advance. When package is processing, the stream controlling module is configured to mark the information in stream data for the decoder server as reference to allocate sufficient video decoding resource to process decoding.

For example, the run code of the step can be as below.

```
if (keyframe) {
    flag |= (loConstants.FLAG_FRAMETYPE_KEYFRAME << 4);
}else {
    flag |= (loConstants.FLAG_FRAMETYPE_INTERFRAME << 4);
}
body.setAutoExpand(true);
body.put(flag);
body.put((byte) avctype);
// TODO: if x264 come with B-frame, delay must set to correct value.
body.put(be24(delay));
body.put(nalu);
body.flip( );
body.limit(bodysize);
```

Step S14: setting connection of server stream.

The stream controlling module of the present invention is configured to set up initial connection to different stream servers. First, the socket of connection status is initialized and the resources for connection are allocated. Then the address of stream servers, connection port, and key are set up. Then the connection between the stream controlling module and the stream servers is activated and enters authentication stage. After the handshake authentication is confirmed and the parameter for transmission is set up, such as chunk size or bandwidth, the initial configuration for stream connection is accomplished. Then stream controlling module then change the connection status to ready to data transmission status.

For example, the run code of the step can be as below.

```
public void setHost(String host) {
    this.host = host;
}
public void setPort(int port) {
    this.port = port;
}
public void setApp(String app) {
    this.app = app;
}
public int getState( ) {
    return currentState;
}
synchronized void setState(int state) {
    this.currentState = state;
```

```
    Log.i(TAG, "RTMP state:" + state);
}
public synchronized void start(String publishName, String publishMode,
Object[ ] params) {
    setState(CONNECTING);
    this.publishName = publishName;
    this.publishMode = publishMode;
    rtmpClient = new RTMPClient( );
    Map<String,         Object>         defParams         =
rtmpClient.makeDefaultConnectionParams(host, port, app);
    rtmpClient.connect(host, port, defParams, this, params);
}
switch (header.getDataType( )) {
    case TYPE_CHUNK_SIZE:
        onChunkSize(conn, channel, header, (ChunkSize) message);
        break;
    case TYPE_INVOKE:
    case TYPE_FLEX_MESSAGE:
        onInvoke(conn, channel, header, (Invoke) message, (RTMP)
session.getAttribute(ProtocolState.SESSION_KEV));
        IPendingServiceCall call = ((Invoke) message).getCall( );
        if    (message.getHeader( ).getStreamId( )    !=   0   &&
call.getServiceName( )              ==              null            &&
StreamAction.PUBLISH.equals(call.getServiceMethodName( ))) {
            if (stream != null) {
                // Only dispatch if stream really was created
                ((IEventDispatcher) stream).dispatchEvent(message);
            }
        }
        break;
    case TYPE_NOTIFY: // just like invoke, but does not return
        if (((Notify) message).getData( ) != null && stream != null) {
            // Stream metadata
            ((IEventDispatcher) stream).dispatchEvent(message);
        } else {
            onInvoke(conn, channel, header, (Notify) message,
(RTMP) session.getAttribute(ProtocolState.SESSION_KEY));
        }
        break;
    case TYPE_FLEX_STREAM_SEND:
        if (stream != null) {
            ((IEventDispatcher) stream).dispatchEvent(message);
        }
        break;
case TYPE_AUDIO_DATA:
case TYPE_VIDEO_DATA:
    //mark the event as from a live source
    //log.trace("Marking message as originating from a Live source");
    message.setSourceType(Constants.SOURCE_TYPE_LIVE);
    //   NOTE:   If   we   respond   to    "publish"   with
"NetStream.Publish.BadName",
    // the client sends a few stream packets before stopping. We need to
ignore them.
    if (stream != null) {
        ((IEventDispatcher) stream).dispatchEvent(message);
    }
    break;
    case TYPE_FLEX_SHARED_OBJECT:
    case TYPE_SHARED_OBJECT:
        onSharedObject(conn, channel, header, (SharedObjectMessage)
message);
        break;
    case Constants .TYPE CLIENT //onBWDone
        log.debug("Client bandwidth: { }", message);
        break;
    case Constants.TYPE_SERVER_BANDWIDTH:
        log.debug("Server bandwidth: { }", message);
        break;
    default:
        log.debug("Unknown type: { }", header.getDataType( ));
```

Step S15: packaging the data.

When stream package is transmitted, a particular message header is necessary for the decoder side. Thus, the stream controlling module is configured to determine the selection of message header according to the present stream data content. Possible message header may comprise the following four types (Format=0, 1, 2, 3)

FMT0 has a message header length of 11 bytes, comprising timestamp variation of 3 bytes, message length of 3 bytes, message ID of 1 byte, message stream ID of 4 bytes, which makes the package an independent message in stream.

FMT1 has a message header length of 7 bytes, comprising timestamp variation of 3 bytes, message length of 3 bytes, message ID of 1 byte, and the message stream ID is omitted, which makes the package a collateral message in the same stream.

FMT2 has a message header length of 3 bytes, comprising timestamp variation of 3 bytes, and message length, message ID, and message stream ID are omitted, which makes the package a collateral message in the same stream with the same message ID and size as the previous one.

FMT3 has a message header length of 0 bytes. The message applies this header means that one message is separated into a plurality of messages, and the later data applies the same timestamp variation, message length, message ID and size as the first one.

The stream controlling module is configured to analyze the corrected timestamp and data size from the video and audio metadata to establish a message header of general package based on the information. For example, it can be HEADER FORMAT(0), CHUNK STREAM ID (3), DATA MESSAGE TYPE ID (18). The analyzed timestamp variation and data size can be put into the message header of package, and the data required for transmission is located after the message header to accomplish the stream package structure.

For example, the run code of the step can be as below.

```
case Constants.TYPE_STREAM_METADATA:
    log.trace("Meta data");
    Notify      notify      =      new      Notify(((Notify)
msg).getDataQ.asReadOnlyBuffer( ));
    notify.setHeader(header);
    notify.setTimestamp(header.getTimer( ));
    data.write(notify);
    break;
```

Step S16: proceeding stream package of audio coding data.

Coded audio coding data is delivered into the exclusive audio data buffer of thread by the audio controlling module. The stream controlling module analyzes the data content according to the thread and get timestamp and data size. Subtracting the timestamp of present audio data package from the previous timestamp of audio data package can derive the variation. Then the stream controlling module selectively establishes the corresponding message header of audio stream package format based on the retrieved information. For example, HEADER FORMAT(0~3), CHUNK STREAM ID (4), AUDIO MESSAGE TYPE ID (8) can be used with the analyzed timestamp variation and data size to be put into the message header of package. Then the audio data can be allocated after the message header to accomplish the audio stream package. For audio, the data size is relatively small, which makes each frame not exceed the chunk size for one-time transmission (chunk size is defined in Step S14), thus the audio stream package can be directly deliver to socket for transmission to stream servers.

For example, the run code of the step can be as below.

```
case Constants.TYPE_AUDIO_DATA:
    log.trace("Audio data");
    buf = ((AudioData) msg).getData( );
    if (buf != null) {
        AudioData      audioData      =      new
AudioData(buf.asReadOnlyBuffer( ));
        audioData.setHeader(header);
        audioData.setTimestamp(header.getTimer( ));
        audioData.setSounceType(((AudioData)msg).getSounceType( ));
        audio.write(audioData);
    } else {
        log.warn("Audio data was not found");
    }
    break;
```

Step S17: proceeding stream package of video coding data.

Coded video coding data is delivered into the exclusive video data buffer of thread by the video controlling module. The stream controlling module analyzes the data content according to the thread and get timestamp and data size. Subtracting the timestamp of present video data package from the previous timestamp of video data package can derive the variation. Then the stream controlling module selectively establishes the corresponding message header of video stream package format based on the retrieved information. For example, HEADER FORMAT(0~3), CHUNK STREAM ID (5), VIDEO MESSAGE TYPE ID (9) can be used with the analyzed timestamp variation and data size to be put into the message header of package. Then the video data can be allocated after the message header to accomplish the video stream package. The video package could comprise I-frame and the data size may exceed the chunk size for one-time transmission (chunk size is defined in Step S14), thus the video stream package may be sliced into several portions (each portion can carry different message header defined in Step S15), and then the several portions can be delivered to socket for transmission to stream servers.

For example, the run code of the step can be as below.

```
synchronized public void pushMessage(IMessage message) throws
IOException {
    if (getState( ) >= PUBLISHED && message instanceof
RTMPMessage) {
        RTMPMessage rtmpMsg = (RTMPMessage) message;
        rtmpClient.publishStreamData(streamId, rtmpMsg);
    } else {
        frameBuffer.add(message);
    }
}
public static int getHeaderLength(byte headerSize) {
    switch (headerSize) {
        case HEADER_NEW:
            return 12;
        case HEADER_SAME_SOURCE:
            return 8;
        case HEADER_TIMER_CHANGE:
            return 4;
        case HEADER_CONTINUE:
            return 1;
        default:
            return -1;
    }
}
case Constants.TYPE_VIDEO_DATA:
    log.trace("Video data");
    buf = ((VideoData) msg) .getData( );
    if (buf != null) {
        VideoData      videoData      =      new
VideoData(buf.asReadOnlyBuffer( ));
```

```
        videoData.setHeader(header);
        videoData.setTimestamp(header.getTimer( ));
        videoData.setSourceType(((VideoData)msg).getSourceType( ));
        video.write(videoData);
    } else {
        log.warn("Video data was not found");
    }
    break;
```

After step S16 and S17, the stream controlling module of the present invention can transmit packaged audio and video in stream to different stream servers, and the method for synchronously taking audio and video in order to proceed one-to-multi multimedia stream of the present invention is accomplished.

The aforementioned description is for one embodiment of the present invention and not intended to limit the scope of the present invention. For the equivalent embodiment or variation within the objective of the present invention should be deemed as within the scope of the present invention.

What is claimed is:

1. A method for synchronously taking audio and video in order to proceed one-to-multi multimedia stream, the method comprises the following steps of:
    proceeding an audio synchronous process through an audio controlling module to get a coded audio coding data from an audio chip of a mobile device via a Hardware Abstraction Layer thereof and get an audio coding parameter, wherein the audio controlling module is configured to temporarily store the audio coding data according to different streaming servers;
    proceeding an audio correction process to execute timestamp correction of temporarily stored audio coding data according to the fixed output frame rate of an audio coder;
    proceeding a video synchronous process through an video controlling module to get a coded video coding data from a video chip of a mobile device via a Hardware Abstraction Layer thereof and get a video coding parameter, wherein the video controlling module is configured to temporarily store the video coding data according to different streaming servers;
    proceeding a video correction process to execute timestamp correction of temporarily stored audio coding data according to the real receiving time on each streaming server;
    establishing a video and audio metadata before the multimedia stream being transmitted to each streaming server by a stream controlling module;
    confirming connection to each different streaming server by the stream controlling module;
    selectively joining the audio coding parameter into the audio coding data corrected by the timestamp via a message package format for packaging and generating a plurality of audio stream packages by the stream controlling module;
    selectively joining the video coding parameter into the audio coding data corrected by the timestamp via a message package format for packaging and generating a plurality of audio stream packages by the stream controlling module; and
    transmitting the audio and video metadata to each streaming server and then sequentially transmitting each audio stream package and video stream package corresponding to each stream server to each stream server by the stream controlling module to proceed the one-to-multi multimedia stream on each streaming server.

2. The method as claimed in claim 1 for synchronously taking audio and video in order to proceed one-to-multi multimedia stream, wherein the audio synchronous process comprising at least the steps of:
   directly retrieving original audio data from the audio chip of the mobile device by the audio controlling module, and inputting the retrieved original audio data into an audio buffer;
   setting the audio coder by applying a predetermined audio related parameter by the audio controlling module;
   executing the audio controlling module to receive a thread according to an audio code to retrieve the audio coding data from the output queue via the set hardware abstraction layer of the audio coder, wherein the audio coding data is generated by the audio coder with the original audio data stored in the audio buffer, and to respectively transmit the audio coding data to a plurality of audio data buffers corresponding to a plurality of stream servers; and
   executing the audio controlling module to record the audio coding data and the audio coding parameter for coding the audio coding data by the audio coder.

3. The method as claimed in claim 1 for synchronously taking audio and video in order to proceed one-to-multi multimedia stream, wherein the video synchronous process comprises at least the steps of:
   executing the video controlling module to apply a predetermined video related parameter to set up the video coder;
   executing the video controlling module to receive a thread according to a video code via the hardware abstraction layer of the mobile device video chip to retrieve the coded video coding data from the output queue;
   executing the video controlling module to input the video coding data into the video buffer;
   executing the video controlling module to record the video coding parameter for the video coder to code the video coding data; and
   executing the video controlling module to respectively transmit the video coding data in the video buffers to a plurality of video data buffers corresponding to a plurality of stream servers.

4. The method as claimed in claim 1 for synchronously taking audio and video in order to proceed one-to-multi multimedia stream, wherein the message package format comprises at least the categories as:
   FMT0 data prolog, having timestamp of package, message length, message type ID, message stream ID, and etc, which means that the package is an independent message in the stream;
   FMT1 data prolog, which is configured to mean that the package is the message within the same stream;
   FMT2 data prolog, which is configured to mean that the package is the message within the same stream, and the data content, type, and length is the same as previous message; and
   FMT3 data prolog, which is configured to mean that the package transmits different portions of the same message, and the later package can be decoded by the same format of the first message.

5. The method as claimed in claim 2 for synchronously taking audio and video in order to proceed one-to-multi multimedia stream, wherein the priority of receiving thread for audio coding is higher than normal thread, thus the audio controlling module is configured to continuously input the original audio data into audio buffer via receiving the thread for audio coding.

6. The method as claimed in claim 1 for synchronously taking audio and video in order to proceed one-to-multi multimedia stream, wherein the audio related parameter comprises at least one of: audio format for coding, audio sample rate, audio channel quantity, and audio coding bit rate.

7. The method as claimed in claim 1 for synchronously taking audio and video in order to proceed one-to-multi multimedia stream, wherein the audio coding parameter is a kind of ASC (Audio Specific Config) parameter comprising at least one of: audio format for coding, audio sample rate, and audio channel quantity.

8. The method as claimed in claim 1 for synchronously taking audio and video in order to proceed one-to-multi multimedia stream, wherein the video related parameter comprises at least one of: VCEG (Video Coding Experts Group) standard parameter for video coding and comprises: video width, video length, video frame per second (FPS), video group of pictures (GOP), video coding bit rate, and video profile.

9. The method as claimed in claim 1 for synchronously taking audio and video in order to proceed one-to-multi multimedia stream, wherein the video coding parameter is SPS (Sequence Parameter Set) and PPS (Picture Parameter Set) parameter comprising at least one of: video format for coding, video format level of coding, length and width of coded video, and category of deblock filter.

10. The method as claimed in claim 1 for synchronously taking audio and video in order to proceed one-to-multi multimedia stream, wherein the video and audio metadata comprises the video related parameter, the video coding parameter, the audio related parameter, and the audio coding parameter.

* * * * *